(12) United States Patent
Pae et al.

(10) Patent No.: US 7,716,242 B2
(45) Date of Patent: May 11, 2010

(54) METHOD AND APPARATUS FOR CONTROLLING ACCESS TO PERSONALLY IDENTIFIABLE INFORMATION

(75) Inventors: Christine Y. Pae, San Francisco, CA (US); Rajesh C. Singh, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 10/968,566

(22) Filed: Oct. 19, 2004

(65) Prior Publication Data

US 2006/0085443 A1    Apr. 20, 2006

(51) Int. Cl.
    G06F 17/30    (2006.01)
(52) U.S. Cl. ............................ 707/783; 726/28; 726/30
(58) Field of Classification Search ................. 707/100, 707/9; 726/27–30, 26
    See application file for complete search history.

(56) References Cited

U.S. PATENT DOCUMENTS

| 6,275,824 | B1 * | 8/2001 | O'Flaherty et al. ............. 707/9 |
| 6,438,544 | B1 * | 8/2002 | Grimmer et al. ............... 707/5 |
| 6,480,850 | B1 * | 11/2002 | Veldhuisen .................... 707/9 |
| 7,069,427 | B2 * | 6/2006 | Adler et al. .................... 713/1 |
| 2003/0088520 | A1 * | 5/2003 | Bohrer et al. ................. 705/74 |
| 2003/0208412 | A1 * | 11/2003 | Hillestad et al. ............. 705/26 |
| 2004/0088295 | A1 * | 5/2004 | Glazer et al. .................. 707/9 |
| 2004/0125798 | A1 * | 7/2004 | Hondo et al. ............... 370/389 |
| 2004/0128546 | A1 * | 7/2004 | Blakley et al. ............. 713/201 |
| 2005/0044409 | A1 * | 2/2005 | Betz et al. .................. 713/201 |
| 2005/0182767 | A1 * | 8/2005 | Shoemaker et al. ........... 707/10 |

* cited by examiner

*Primary Examiner*—Hosain T Alam
*Assistant Examiner*—Amy Ng
(74) *Attorney, Agent, or Firm*—Park, Vaughan & Fleming LLP

(57) ABSTRACT

One embodiment of the present invention provides a system that controls access to personally identifiable information (PII) in a database system. During operation, the system receives a request from an application to perform a function which involves accessing information in the database system. In response to the request, the system identifies a purpose that the application has in making request to perform the function. Next, the system uses the purpose to identify a set of attributes in the database system, which are associated with the purpose. The system then determines if any of the identified attributes contain PII. If so, the system enforces access controls while accessing the identified attributes containing PII.

14 Claims, 4 Drawing Sheets

| PURPOSE OBJECT 302 |     |
|---|---|
| PURPOSE CODE | 304 |
| APPLICATION ID | 306 |
| DESCRIPTION | 308 |
| ⋮ | |

| ASSOCIATION OBJECT 312 |     |
|---|---|
| ASSOCIATION ID | 314 |
| PURPOSE CODE | 316 |
| ATTRIBUTE CODE | 318 |
| SETTING | 320 |
| ⋮ | |

| ATTRIBUTE OBJECT 322 |     |
|---|---|
| ATTRIBUTE ID | 324 |
| TYPE | 326 |
| NAME | 328 |
| PII FLAG | 330 |
| SENSITIVITY | 332 |
| LOCKED FLAG | 334 |
| DESCRIPTION | 336 |
| ⋮ | |

COLUMN OBJECT 342

| ATTRIBUTE CODE | 344 |
| --- | --- |
| APPLICATION ID | 346 |
| TABLE ID | 348 |
| COLUMN ID | 350 |
| COLUMN SEQUENCE | 352 |
| ⋮ | |

FIG. 3D

METHOD AND APPARATUS FOR CONTROLLING ACCESS TO PERSONALLY IDENTIFIABLE INFORMATION

BACKGROUND

1. Field of the Invention

The present invention relates to techniques for providing security in database systems. More specifically, the present invention relates to a method and an apparatus for controlling access to personally identifiable information (PII) in database systems.

2. Related Art

The ubiquity of the Internet makes many types of personal information easily accessible to more people than ever before. Organizations can use this information to market products to their customers more efficiently than ever before. However, the availability of personal information through unrestricted data sharing has also led to increases in identity theft and Internet fraud. A recent report from the Federal Trade Commission (FTC) estimates that Internet fraud victims lost close to $54M in the year 2002, which is up from $17M in 2001.

A number of laws have been enacted to combat this growing problem. For example, California Senate Bill 1386, effective Jul. 1, 2003, requires that companies inform customers of breaches of PII to help protect them against identity theft. This mandate applies to any person or organization that holds personal information about California residents. Note that the scope of this bill is unusually large, because unlike other regulations which typically apply to specific industries, this bill encompasses all industries and sectors.

Furthermore, consumers are becoming increasingly sensitive to privacy issues. Increasing volumes of direct marketing via email and the overwhelming volume of spam have increased consumer privacy concerns and the likelihood that individuals will opt out of various forms of communication through multiple channels. Moreover, the sharing of information with partners or other third parties is a concern for consumers who value their privacy and are wary of potential abuse. Consequently, today's customers, especially when working online, look for hallmarks of trust and for brands that they can count on to safeguard their personal information from misuse and wrongful access.

As a result of these trends, privacy is becoming not just an important compliance issue but an essential business issue. As competition on the Internet continues to drive down pricing on consumer goods, the importance of customer loyalty increases. Furthermore, when price is no longer a differentiator, service and trust become more important factors in customer retention, and businesses can use effective data privacy practices as competitive differentiators. Hence, in today's business climate, companies can reap substantial rewards by addressing privacy concerns and building trust.

To summarize, reliable privacy protection is something organizations cannot afford to dismiss. Every organization that collects personal information about customers or employees must protect the privacy of that data both to comply with regulatory requirements and to build customer confidence and trust.

Hence, what is needed is a method and an apparatus for effectively controlling access to personally identifiable information (PII).

SUMMARY

One embodiment of the present invention provides a system that controls access to personally identifiable information (PII) in a database system. During operation, the system receives a request from an application to perform a function which involves accessing information in the database system. In response to the request, the system identifies a purpose that the application has in making request to perform the function. Next, the system uses the purpose to identify a set of attributes in the database system, which are associated with the purpose. The system then determines if any of the identified attributes contain PII. If so, the system enforces access controls while accessing the identified attributes containing PII.

In a variation on this embodiment, after identifying the purpose associated with the request, the system identifies a role associated with the application. Next, the system determines if the role is empowered to have the identified purpose, and if so, identifies the set of attributes associated with the purpose.

In a variation on this embodiment, enforcing the access controls involves restricting access to specific attributes containing PII for users who have opted out of disclosing the specific attributes.

In a further variation, users can opt out of disclosing "voluntary attributes" containing PII, and users cannot opt out of disclosing other "mandatory attributes" containing PII.

In a variation on this embodiment, the system enforces policies for attributes containing PII in the database system.

In a variation on this embodiment, the system restricts access to specific attributes in the database system containing PII regardless of the purpose.

In a variation on this embodiment, the system restricts access to specific attributes in the database system which do not contain PII.

In a variation on this embodiment, database system includes tables, which are organized into rows and columns, wherein the columns are associated with attributes.

In a variation on this embodiment, each attribute containing PII is associated with a sensitivity level which indicates whether the attribute is, public, private, confidential or sensitive.

BRIEF DESCRIPTION OF THE FIGURES

FIG. 3D illustrates a column object in accordance with an embodiment of the present invention.

Figure 1:
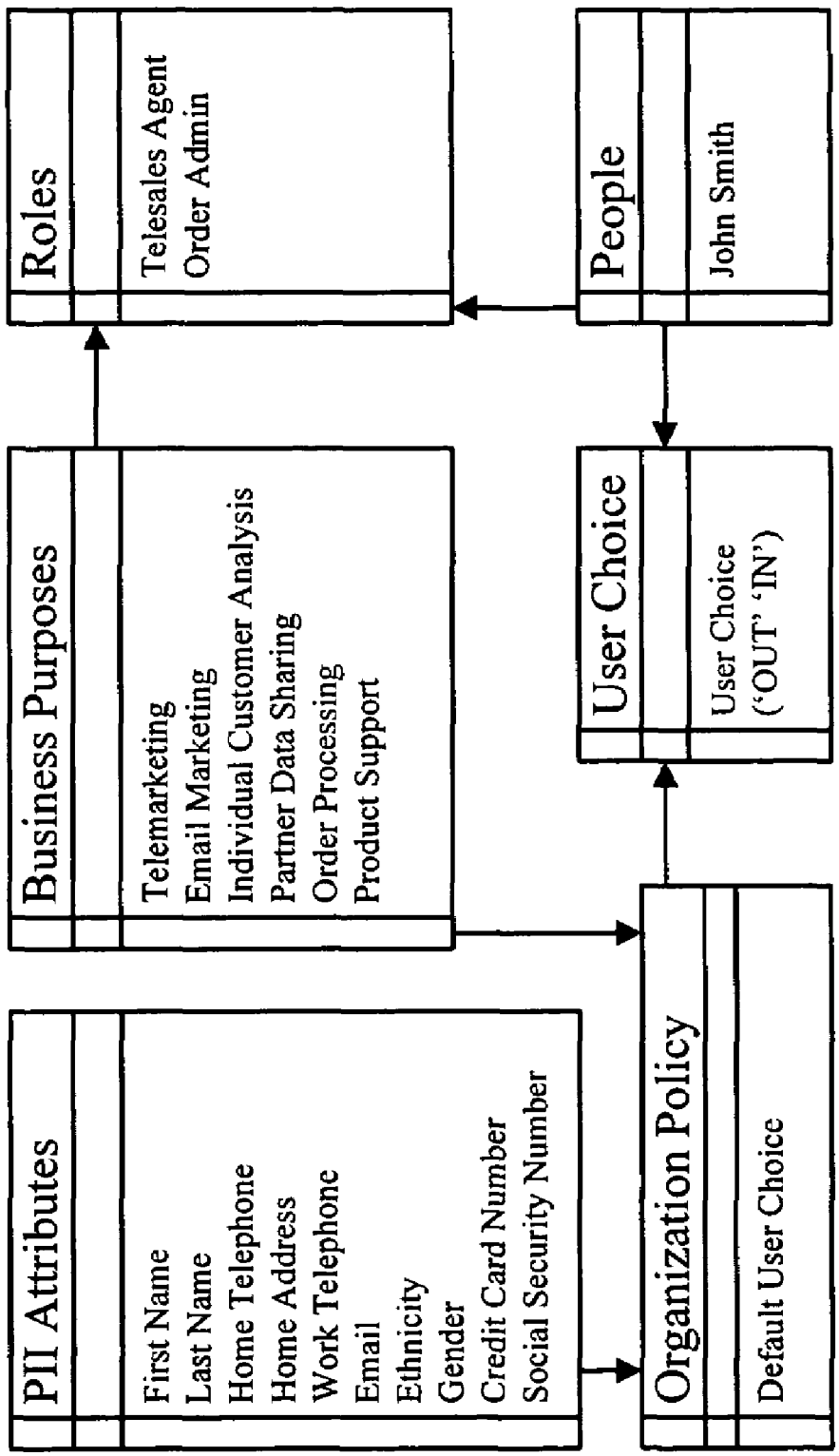
FIG. 1 shows how three major building blocks—PII attributes, purposes and roles—tie together to transform a privacy policy into a representation of metadata that can be used to facilitate compliance in accordance with an embodiment of the present invention.

Table 1 lists various PII attributes in accordance with an embodiment of the present invention.

Table 2 illustrates a sample organization privacy policy in accordance with an embodiment of the present invention.

Table 3 illustrates a sample set of user choices in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Discussion

The following discussion briefly describes various aspects of security and privacy before describing a system that controls access to personally identifiable information (PII) in accordance with an embodiment of the present invention.

Security and Privacy

Security and privacy are related, but are not the same thing. The term "security" refers to the protection of data from unauthorized access, while maintaining the integrity and availability of the data. In contrast, the term "privacy" relates to an organization's control of personal information with regard to a customer's stated preferences and in accordance with terms under which the data was originally collected. Note that privacy requires security but data can be secure without being private. Hence, an organization can take many measures to secure data but may still not protect privacy.

Many features associated with security and privacy are common to both concepts, but are effective only when implemented with both privacy and security in mind. For example, a clear Plexiglas door with an advanced locking system may be incredibly strong, even bullet proof, but while it is very secure, the door doesn't protect privacy. A wooden door, on the other hand, may prevent observation and help protect privacy while also providing security. Likewise, a retail store that captures personal information and ensures that only authorized people have access to the data has taken measures to secure the data. If, however, that store shares information with their partners and has no control on how the data will then be used, they have not safeguarded data privacy. A privacy-enabled system has mechanisms to ensure that partners safeguard data privacy according to the terms under which the data was originally collected.

One embodiment of the present invention provides a system that meets specific privacy requirements. Such a system enables organizations to manage and automate complex business processes for functions such as sales, purchasing, order management, manufacturing, financials and human resources. Hence, the present invention addresses the common regulatory requirements for data privacy, including:

notice and consent;

user choice;

access and control;

monitoring and compliance; and security.

The following sections explain how one embodiment of the present invention addresses the above requirements.

Notice and Consent

Notice and consent are fundamental requirements of most privacy laws. All companies collecting PII information should clearly state:

what PII are they collecting;

how they collect it;

for what purpose(s) they plan to use the data;

what choices they offer concerning the use of PII;

who will have access to the PII; and who to contact with inquiries regarding PII usage.

When consent for usage is required, it may be obtained at the point of collection, or through a separate indication of agreement to the terms of the privacy policy. Any change in policy should be appropriately communicated to users and where the intended use has been altered from the original, a new consent must be obtained.

One embodiment of the present invention enables the enterprise to transform privacy policy into a representation of metadata. Organizations can use this metadata to track whether they can and do comply with their privacy policies. In one embodiment of the present invention, this metadata can be constructed from three building blocks: PII attributes, purposes and roles.

PII Attributes

TABLE 1

| PII Attributes |
| --- |
| First Name |
| Last Name |
| Home Telephone |
| Work Telephone |
| Email |
| Ethnicity |
| Gender |
| Credit Card Number |
| Social Security Number |

A privacy policy lists all PII that the organization is collecting. The PII Attributes entity defines the logical attributes that identify personal and sensitive data associated with a person. In one embodiment of the present invention, a system that collects PII is comprised of product families, such as Human Resources, Customer Resource Management, Financials and Manufacturing. Hence, in this system, PII attributes are stored in multiple tables and columns according to the product family with which they are associated. This system also provides seeded metadata and a dictionary to track where PII resides and to ensure that the same privacy principles are applied to all personal data.

If an organization wants to enhance auditing or implement additional security around specific types of PII, the PII attributes entity makes it easy to identify which tables and columns in the application to focus on. PII attributes can be classified with different privacy levels such as "public," "private," "confidential" and "sensitive." Some exemplary PII attributes are listed in Table 1 above.

Purposes

A privacy policy lists the purposes for which the PII is being collected. The "purpose" entity identifies the purpose the data will be used for. For example, some common purposes are "telemarketing" and "order processing." Note that the present invention provides seeded values for purposes, and allows additional purposes to be added.

Roles

Roles determine who has access to what information. As mentioned above, one of the requirements for privacy is ensuring that only the right people have access to the PII. One embodiment of the present invention provides a "role-based access control" feature which is described in the "access and control" section below.

FIG. 1 illustrates how the three major building blocks—PII attributes, purposes and roles—tie together to transform a privacy policy into a representation of metadata that can be used to facilitate compliance.

Sample Privacy Policy

The following is a snippet of the privacy policy of a fictitious bank.

We collect your Name, Address, Telephone, Email, and demographic data to process your loan. By default, we do not share any of this information with anyone other than our partners, but we do provide this information to some government organizations for legal purposes. We also use the collected data for marketing new products. You have the option to opt-out if you do not want any piece of your information to be used by our marketing organization in contacting you.

In one embodiment of the present invention, within the system's privacy metadata, a table called "organization privacy policy" represents the above policy with the default user choices. When the default user-choice in the table is "opt-in" the user can opt-out from allowing the organization to use the PII attribute for the specified purpose.

Table 2 above represents the above policy in which a customer has to explicitly opt-out for any of the PII attributes "name," "address," "telephone" and "demographics" if he does not want those attributes to be used for telemarketing activities. The customer also has to explicitly opt-in if he wants the organization to share his data. However, when the purpose is legally mandated data sharing, the customer cannot opt-out, so the default user choice is "mandatory."

TABLE 2

| Business Purpose | PII Attributes | Default User Choice |
|---|---|---|
| Telemarketing | Name | Opt-In |
|  | Address | Opt-In |
|  | Telephone | Opt-In |
|  | Demographic | Opt-In |
| Email Marketing | Name | Opt-In |
|  | Email Address | Opt-In |
| Partner Data Sharing | Name | Opt-Out |
|  | Address | Opt-Out |
|  | Telephone | Opt-Out |
|  | Email Address | Opt-Out |
| Legally Mandated Sharing | Name | Mandatory |
|  | Address | Mandatory |
|  | Telephone | Mandatory |
|  | Social Security Number | Mandatory |
| Loan Processing | Name | Mandatory |
|  | Address | Mandatory |
|  | Telephone | Mandatory |
|  | Email Address | Mandatory |

User Choice

Organizations collect PII in order to do business with the people to whom the information refers. Data can be collected by various methods, such as: online or offline registration; sharing by third parties and partners; or physical forms filled out at events. Regardless of the method used to collect this data, it is important for the users to know what choices they have regarding the usage of their PII. A user should also be able to review and edit his or her choices.

One embodiment of the present invention enables users to opt-in or-out based on PII attributes for different business purposes. In the above example, the company collects demographic (gender, marital status, ethnicity) data and by default all users opt-in. Table 3 below shows that a user has opted-in to allowing his name, address, telephone number and demographic data to be used for telemarketing purposes.

TABLE 3

| Business Purpose | PII Attributes | User Choice |
|---|---|---|
| Telemarketing | Name | Opt-In |
|  | Address | Opt-In |
|  | Telephone | Opt-In |
|  | Demographic | Opt-In |

In one embodiment of the present invention, for a given business purpose, all of the PII attributes have to be either 'Opt-In', or, 'Opt-Out', or, 'No Choice'. In other words, the system does not allow the user to opt-in or opt-out of a specific attribute within a business purpose. This is only allowed at the Business Purpose level. However, the system does allow users to 'Opt-out' of 'Name' for example; in which case, the system will opt them out of all business purposes that use Name.

Besides allowing opt-in/out for the usage of PII, one embodiment of the present invention gives end users granular control over their contact preferences. For example, a user could state that, even though he has opted-in for telemarketing, he only wants to be called on his home phone. However, if he must be contacted regarding a specific product support or billing issue, then he can be contacted on his cellular phone.

Access and Control

The subjects of PII have the right to review their data for accuracy. A person's PII should be accessible only to those who have a business need for it. For example, credit card information is collected to fulfill an order, so the order administrator needs that information. No other person in the organization should have access to that credit card information unless it is required for the role they perform.

One embodiment of the present invention also provides granular access control. Access can be controlled at a user level or for a group of users by associating people with data through a number of mechanisms, including:

- function security;
- data security; and
- role-based access control.

Function Security

In one embodiment of the present invention, function security is the first level of access control. It controls the actions a user can perform by authorizing which applications and modules the user can access. Function security is maintained at the business level rather than the physical level. Functions represent access to user interfaces, as well as to actions within those interfaces such as pressing a particular button. Functions are organized hierarchically through a menu construct. Menus group functions logically to build up a tree that gives access to everything a user needs to perform a certain business function. The root menu that lets one perform everything in a particular job is associated with a responsibility. Users can be assigned to one or more responsibilities to get access to different functions.

Data Security

In one embodiment of the present invention, the data security system allows administrators to control user access to specific instances of data, as well as what operations the users can apply to the data by defining security policies. Data security is based on granting privileges to an individual or a group of users to perform an operation on a specific data object and instances of the data set. An example of a data security policy might be "billing user John Doe (JDOE) may update invoices for ABC Corporation only." In this example, the object is "invoice," the operation is "update" and the permission is "update invoice." Access based on function security grants permission to update all invoices. Data security can narrow that permission to a specific instance set, thereby allowing administrators to model and enforce security authorizations for access and modification of specific data records.

Role-Based Access Control Model

Role-Based Access Control (RBAC) is a security mechanism standard proposed by the National Institute of Standards & Technology (NIST). RBAC greatly lowers the cost and complexity of security administration by using roles, hierarchies, and constraints to organize privileges.

One embodiment of the present invention provides a system which supports RBAC. In this system, users are assigned one or many roles. All system functions (also termed permissions) can be grouped into permission sets. A permission provides an approval to perform an operation on one or more objects. For example, an object can be: a database table or view, a form, an HTML Page, or a UI widget. Examples of permissions include "invoke service request form," "update order for customer ABC Corporation," "approve expense report," and "query customer." Permissions are assigned to roles, and roles are assigned to users.

In one embodiment of the present invention, RBAC enhances standard function security by integrating with data security to simplify the administration of granular access control. Consider the two roles "salesrep" and "sales manager." Some of the standard functions of a salesrep could include updating data pertaining to his set of customers and submitting his expenses. A sales manager should be able to update information for all customers managed by his group of salesreps, and to approve expenses submitted by his salesreps. In standard function security, each of the two roles must be assigned each of the functions. In contrast, in RBAC the sales manager role will inherit all of the functions or permissions assigned to the salesrep, so only the additional permissions need to be assigned. When managing a large set of users with a large number of roles, access control using standard function security alone becomes a significant challenge.

RBAC also supports assigning permissions to groups imported from an LDAP directory, which helps organizations apply uniform access control policies across disparate systems.

In the context of privacy and controlling access to PII, RBAC allows administrators to control who can access and perform operations on PII. For example, a salesrep can be assigned access to only his customers placing orders and their PII, but may not have access to the credit card number, whereas an order administrator can access all customers placing orders, but may have access only to the relevant PII such as contact information.

System

Figures 2, 3A, 3B, 3C:
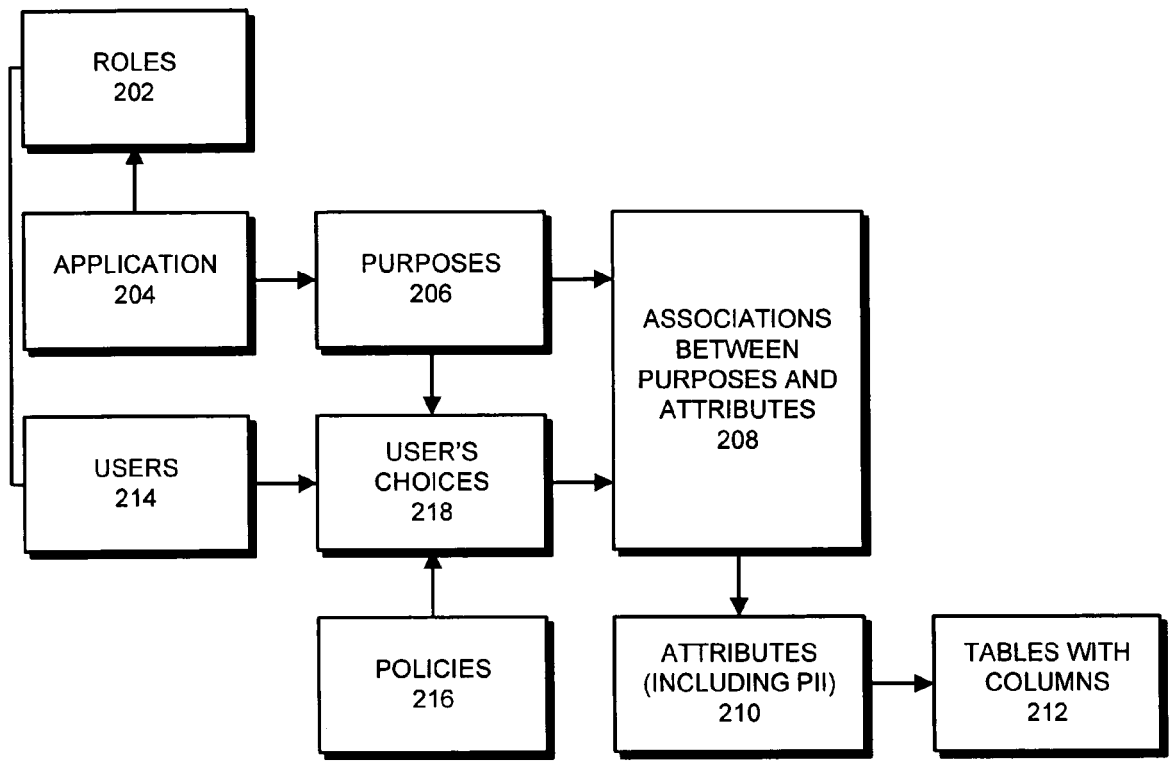
FIG. 2 illustrates the structure of a system for controlling access to PII in accordance with an embodiment of the present invention.
FIG. 3A illustrates a purpose object in accordance with an embodiment of the present invention.
FIG. 3B illustrates an association object in accordance with an embodiment of the present invention.
FIG. 3C illustrates an attribute object in accordance with an embodiment of the present invention.

FIG. 2 illustrates the structure of a system for controlling access to personally identifiable information (PII) in accordance with an embodiment of the present invention. In this system, each application 204 is associated with one or more roles 202 and one or more purposes 206. Note that while performing a given function, the application 204 assumes a single role and a single purpose. Before performing the function, the system checks whether the role is empowered to have the identified purpose.

The system also maintains a set of associations 208 between purposes and attributes. These associations 208 are used to determine a set of attributes 210 that are associated with a given purpose. (Note that some of these attributes can contain PII.) In order to perform the requested function, these attributes are accessed from the columns of tables 212 in which they reside.

The system also receives input from users 214 to produce a set of user choices 218, which specify whether or not the users have decided to opt-in or opt-out of disclosing specific attributes containing PII. Note that the gathering and use of these user choices can be governed by a set of policies 216.

Furthermore, these policies 216 can specify more generally how PII is managed. For example, a policy can state that three years after an employee leaves a company the employee's information is "depersonalized" by removing all of the employee's PII from the company's records.

In one embodiment of the present invention, purposes 206 are stored as purpose objects. Referring to FIG. 3A, each purpose object 302 includes: a purpose code 304 which identifies the purpose; an application ID 306 which identifies the application which the purpose is associated; and a description 308 of the purpose.

In one embodiment of the present invention, associations 208 are stored as association objects. Referring to FIG. 3B, each association object 312 includes: an association ID 314 which identifies the association; a purpose code 316 which identifies the specific purpose, and an attribute code 318 which identifies a specific attribute associated with the specific purpose. The association object can also include a setting flag 320, which indicates whether the attribute is required, or whether the users can opt-in or opt-out of disclosing the attribute.

In one embodiment of the present invention, attributes 210 are stored as attribute objects. Referring to FIG. 3C, each association object 322 includes: an attribute ID 324 which identifies the attribute; a type identifier 326 which identifies the data type of the attribute; a name 328 for the attribute; a PII flag 330 which indicates whether or not the attribute contains PII; a sensitivity flag 332 indicating whether the attribute is public, private, confidential or sensitive; a locked flag 334 which indicates whether or not customers can change the attribute; and a description of the attribute 336.

One embodiment of the present invention also supports column objects. For example, referring to FIG. 3D, each column object 342 includes: an attribute code 344, which identifies a specific attribute associated with the column; an application ID 346 which identifies an application with which the column is associated; a table ID 348 which identifies the table with which the column is associated; a column ID 350 which identifies the column; and a column sequence 352 which is associated with the column.

Process of Restricting Access to Personally Identifiable Information

Figure 4:
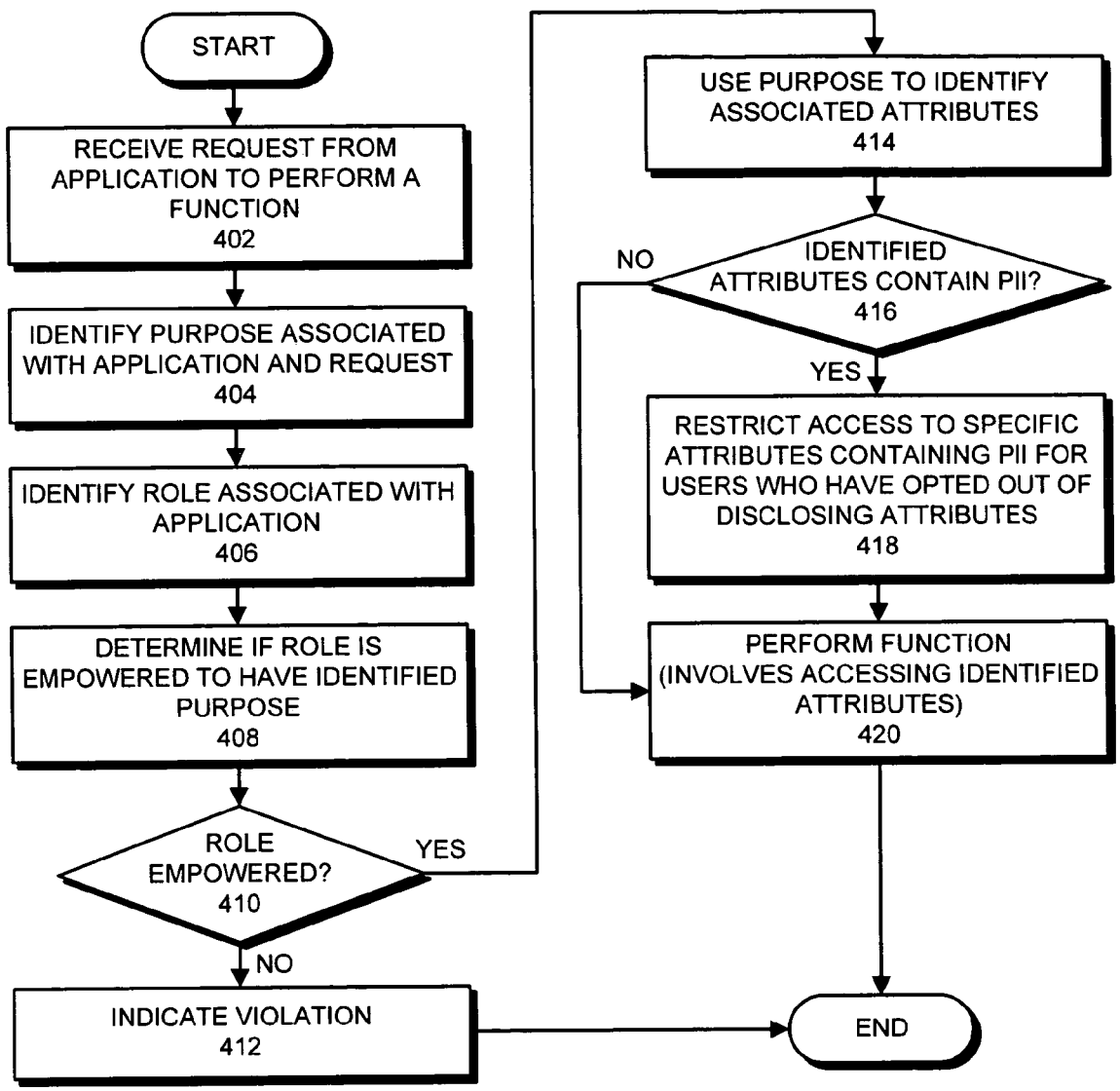
FIG. 4 presents a flow chart illustrating the process of restricting access to PII in accordance with an embodiment of the present invention.

FIG. 4 presents a flow chart illustrating the process of restricting access to PII in accordance with an embodiment of the present invention. The process starts when the system receives a request from an application to perform a function (step 402). Next, the system identifies a purpose associated with the application and the request (step 404). The system also identifies a role associated with the application in making the request (step 406).

Next, the system determines if the role is empowered to have the identified purpose (step 408). If not, the system indicates a violation (step 412) and possibly performs a remedial action. Otherwise, if the role is empowered to have the identified purpose, the system performs a lookup based on the purpose to identify attributes associated with the purpose (step 414).

Next, the system determines whether or not the identified attributes contain PII (step 416). If not, the system performs the function, which involves accessing the identified attributes from the underlying database tables (step 420).

On the other hand, if attributes contain PII, the system enforces access controls for attributes containing PII. In one embodiment of the present invention, this involves restricting access to specific attribute containing PII for users who have opted out of disclosing the attributes (step 418). This can be accomplished by constructing a predicate which filters out accesses to the specific attribute for users who have opted out of disclosing the attribute. Next, the system proceeds to step 420 to perform the function.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

Furthermore, the data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Additionally, the above disclosure is not intended to limit the present invention. The scope of the present invention is defined by the appended claims.

What is claimed is:

1. A method for controlling access to personally identifiable information (PII) of a data owner in a database system, comprising:

allowing the data owner to specify different opt-in or opt-out choices with respect to different business purposes for a given PII attribute, wherein the business purposes are listed in a privacy policy, which indicates an organization's control of PII in accordance with the data owner's preference, and wherein the data owner can opt out voluntary but not mandatory attributes information containing PII;

receiving a request from an application to access attributes associated with the data owner in the database system;

identifying a business purpose that the application has in making the request, wherein the business purpose identifies how the application uses the accessed attributes;

identifying a set of attributes associated with the data owner corresponding to the identified business purpose;

determining that the identified attributes contain a PII attribute that the data owner has opted out; and, enforcing access control by restricting access to the identified attributes containing the PII attribute based on the data owner's choice with respect to the PII attributes for the identified business purpose.

2. The method of claim 1, wherein after identifying the business purpose associated with the request, the method additionally comprises:

identifying a role associated with the application;

determining if the role is empowered to have the identified business purpose; and if so, identifying the set of attributes associated with the business purpose.

3. The method of claim 1, further comprising enforcing policies for attributes containing PII in the database system.

4. The method of claim 1, further comprising restricting access to specific attributes in the database system containing PII regardless of the business purpose.

5. The method of claim 1, further comprising restricting access to specific attributes in the database system which do not contain PII.

6. The method of claim 1, wherein the database system includes tables, which are organized into rows and columns, wherein the columns are associated with attributes.

7. The method of claim 1, wherein each attribute containing PII is associated with a sensitivity level which indicates whether the attribute is, public, private, confidential or sensitive.

8. A computer-readable storage medium storing instructions that when executed by a computer cause the computer to perform a method for controlling access to personally identifiable information (PII) of a data owner in a database system, the method comprising:

allowing the data owner to specify different opt-in or opt-out choices with respect to different business purposes for a given PII attribute, wherein the business purposes are listed in a privacy policy, which indicates an organization's control of PII in accordance with the data owner's preference, and wherein the data owner can opt out voluntary but not mandatory attributes information containing PII;

receiving a request from an application to access attributes associated with the data owner in the database system;

identifying a business purpose that the application has in making the request, wherein the business purpose identifies how the application uses the accessed attributes;

identifying a set of attributes associated with the data owner corresponding to the identified business purpose;

determining that the identified attributes contain a PII attribute that the data owner has opted out; and, enforcing access control by restricting access to the identified attributes containing the PII attribute based on the data owner's choice with respect to the PII attributes for the identified business purpose.

9. The computer-readable storage medium of claim 8, wherein after identifying the business purpose associated with the request, the method additionally comprises:

identifying a role associated with the application;

determining if the role is empowered to have the identified business purpose; and if so, identifying the set of attributes associated with the business purpose.

10. The computer-readable storage medium of claim 8, wherein the method further comprises enforcing policies for attributes containing PII in the database system.

11. The computer-readable storage medium of claim 8, wherein the method further comprises restricting access to specific attributes in the database system containing PII regardless of the business purpose.

12. The computer-readable storage medium of claim 8, wherein the method further comprises restricting access to specific attributes in the database system which do not contain PII.

13. The computer-readable storage medium of claim 8, wherein the database system includes tables, which are organized into rows and columns, wherein the columns are associated with attributes.

14. The computer-readable storage medium of claim 8, wherein each attribute containing PII is associated with a sensitivity level which indicates whether the attribute is, public, private, confidential or sensitive.

* * * * *